Oct. 16, 1951     F. J. COCHNAR     2,571,682

LAND MEASURING DEVICE

Filed May 20, 1949

Inventor

Frank J. Cochnar

By Arthur H. Sturges

Attorney

Patented Oct. 16, 1951

2,571,682

UNITED STATES PATENT OFFICE 2,571,682

LAND MEASURING DEVICE

Frank J. Cochnar, Dorchester, Nebr.

Application May 20, 1949, Serial No. 94,469

1 Claim. (Cl. 235—95)

This invention relates to land measuring devices and more particularly it is an object of the invention to provide a device which is adapted to be attached to a wheeled-vehicle.

In the harvesting of grain by contract there is often much controversy concerning the exact size of a piece of ground, the owner maintaining the size to be smaller than the harvest contractor believes it to be.

This invention provides a land measuring device for attachment to a wheeled-vehicle and which is adapted to measure the distance traveled by the vehicle whereby land can be quickly measured for avoiding disputes and arguments of this nature and for assuring that a harvesting contract based on the size of the ground will be fair to all parties concerned.

Yet a further object of the invention is to provide a device as described which can be easily installed on a wheeled-vehicle.

A further object of the invention is to provide a land-measuring device as described which will not back up or uncount at times when it is necessary to drive the attached vehicle in a reverse direction.

Still a further object of the invention is to provide a device which is adapted to include the use of conventionally mass-produced counting mechanisms for maintaining a low production cost.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figure 2:
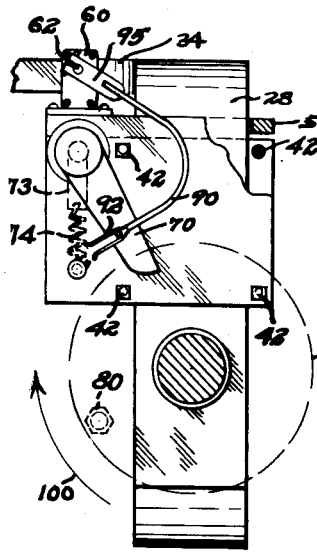
Figure 2 is a view-in-section taken along the line 2—2 of Figure 1, a circular plate of the wheel hub being indicated in Figure 2 by means of a circular dotted line.
Figure 1:
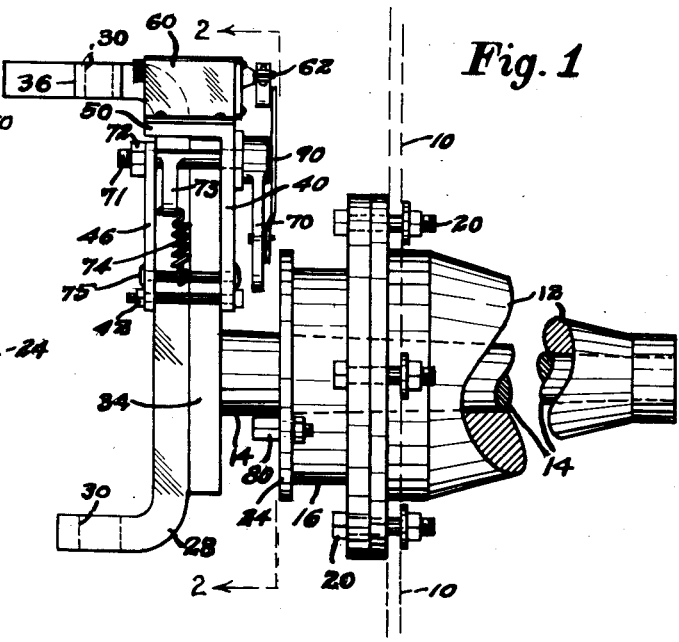
Figure 1 is a rear elevation of the measuring device of the invention shown as attached to the hub and axle assembly of a vehicle, certain parts of the assembly being broken away and other parts showing in section, parts of a wheel being shown in dotted lines.

The land measuring device of this invention is adapted for attachment to a harvester, farm vehicle or to an automobile adjacent to the front wheel thereof. Such a wheel is indicated in dotted lines in Figure 1 and is provided with a hub 12 which latter is adopted to rotate upon a spindle 14.

A hub extension 16 of conventional construction is secured to the hub 12 by means of bolts 20 which latter also secure the wheel 10 to the hub 12. The extension 16 is conventionally provided with a plate 24 which is adapted to rotate in a vertical plane.

The plate 24 and extension 16 both rotate about the spindle 14 which latter is rigidly secured to a C-shaped spindle attachment member or yoke 28. The member or yoke 28 is provided with apertures 30 for receiving a bolt for attachment to the front axle of a vehicle, as is conventional with certain farm vehicles as well as with automobiles. A plate 34 is disposed between the member 28 and the spindle 14 for purposes of spacing the C-shaped member 28 from the hub extension 16, and for reasons later described.

The C-shaped member 28 is provided with a rearwardly extending rod attachment arm 34, as is conventional, the latter having a reach rod attachment aperture 36.

In accordance with this invention, a mounting member 40 is secured to the wheel attachment member 28 by means of bolts 42 and a backing plate 46. The member 40 is disposed on the outer side of the extension plate 34 and the inward plate 46 is disposed on the inner side of the C-shaped member 28. The bolts 42 secure the members 40 and 46 together rigidly on the C-shaped member 28.

The member 40 is provided with a platform portion 50 extending at a right angle with respect thereto horizontally above the remainder thereof. The purpose of the platform portion 50 is to uphold a counting device 60 secured thereto.

The counter 60 may be one of many kinds available upon the market and has a rotatable, outwardly extending shaft 62 and an upwardly disposed window 64 for the purpose of revealing numerals 66 which latter indicate the number of times the shaft 62 has been actuated.

In accordance with this invention a downwardly extending arm 70 is provided and is pivotally secured to the members 40 and 46 by means of an axle 71 and nut 72. The arm 70 is disposed between the filler plate 34 and hub plate 24.

The axle is provided with an outwardly extending arm 73 to which a tension spring 74 is secured. The tension spring 74 extends downwardly to a pin 75 which latter is secured across the members 40 and 46.

The counter 60 is provided with a rotatable knob 76 for turning the numbers 66 back to zero positions.

The arm 70 is disposed in the orbit of a bolt or stud 80 which latter extends inwardly of the vehicle from the plate 24 in a position spaced outwardly from the spindle 14.

A flexible resilient rod 90 is provided having a forked member 92 on its lower end for receiving a nib or pin 94 on the lower end of the arm 70. The rod 90 extends forwardly, then rearwardly, in a substantially U-shaped configuration, being secured by means of a clamp member 95 on its upper end to the axle or shaft 62 of the counting member 60.

In operation, it will be seen that, as the wheel 10 rotates, the nut 80 will rotate with it in the direction of the arrow 100.

Figure 3:
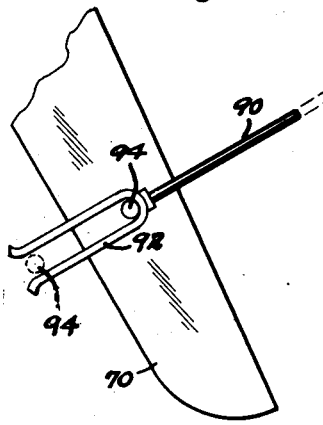
Figure 3 is a detailed view of a lower end portion of an arm, bifurcated member, and an end portion of a rod employed, a rest position of a nib on said arm being shown in dotted lines.
Figure 4:
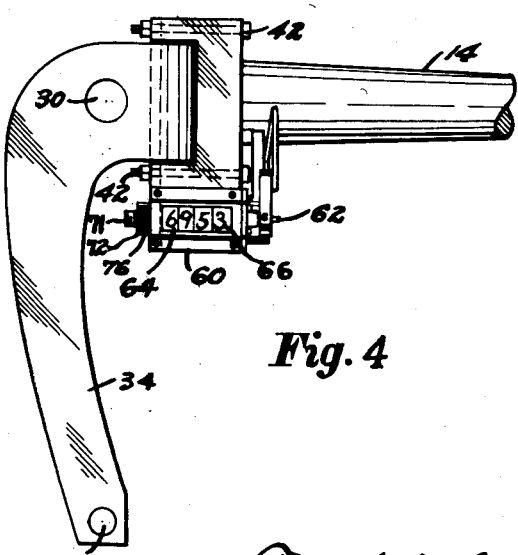
Figure 4 is a top plan view of the counting mechanism and reach rod attachment arm, together with a portion of a spindle or stud axle of the wheel of Figure 4.

As the nut 80 revolves, it strikes the arm 70 causing the nib 94 to travel from the dotted line position thereof shown in Figure 3 to a position pushing upwardly and forwardly on the forked member 92 for urging the arm 90 in a counter-clockwise direction, rotating the shaft 62 for causing the numerals 66 to count motions of the rod 90, arm 70, and revolution of the nut 80.

It will be seen that, since the circumference of that wheel 10 can be determined, the distance traveled can be computed from the number of wheel revolutions read in the window 64.

As a summary, this invention has provided a land-measuring device, of great accuracy, simplicity of construction, reliability, durability, and of great value to harvest contractors.

From the foregoing description it is thought to be obvious that a land measuring device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In a land measuring attachment for a vehicle, the combination which comprises a wheel carrying spindle, a vertically disposed C-shaped axle mounting yoke from which the spindle extends, an extension plate extended over the spindle and positioned against the outer face of the yoke, an L-shape mounting member having a vertical leg positioned against the face of the said extension plate and a horizontal leg extended across one side of the yoke, an inner plate positioned against the inner face of the yoke, bolts extended through the said inner plate and vertical leg of the mounting member clamping the said mounting member to the yoke, an arm pivotally mounted in the said mounting member and inner plate, a counter mounted on the said horizontal leg of the mounting member, a resilient rod connecting the pivotally mounted arm to the counter, a wheel mounting hub having a flange on the inner end positioned around the said spindle, an extension hub having a flange on the outer end corresponding with the flange of the wheel mounting hub and having an annular plate on the inner end parallel to and spaced from the flange, and also spaced from the said extension plate positioned against the outer face of the yoke, bolts securing the flange of the extension hub to the flange of the wheel mounting hub, and a stud carried by the annular plate of the extension hub and positioned to engage the said arm pivotally mounted in the L-shape mounting member and inner plate for actuating the said counter with each revolution of the said wheel mounting hub.

FRANK J. COCHNAR.

REFERENCES CITED

The following references are of record in the file of this patent:

UNITED STATES PATENTS

| Number | Name | Date |
| --- | --- | --- |
| 50,456 | Coburn | Oct. 17, 1865 |
| 164,424 | Chambers | June 15, 1875 |
| 202,240 | Dadisman | Apr. 9, 1878 |
| 221,652 | Yount | Nov. 11, 1879 |
| 985,448 | Redington | Feb. 28, 1911 |
| 1,813,410 | Kupetz | July 7, 1931 |